Sept. 1, 1959 W. H. TAYLOR 2,901,952
APPARATUS FOR FEEDING, COUNTING AND STACKING
MAGAZINES, BOOKS AND OTHER ARTICLES
Filed Dec. 16, 1955 5 Sheets-Sheet 3

Inventor.
William H. Taylor.

By Wilson & Geppert
Attorneys.

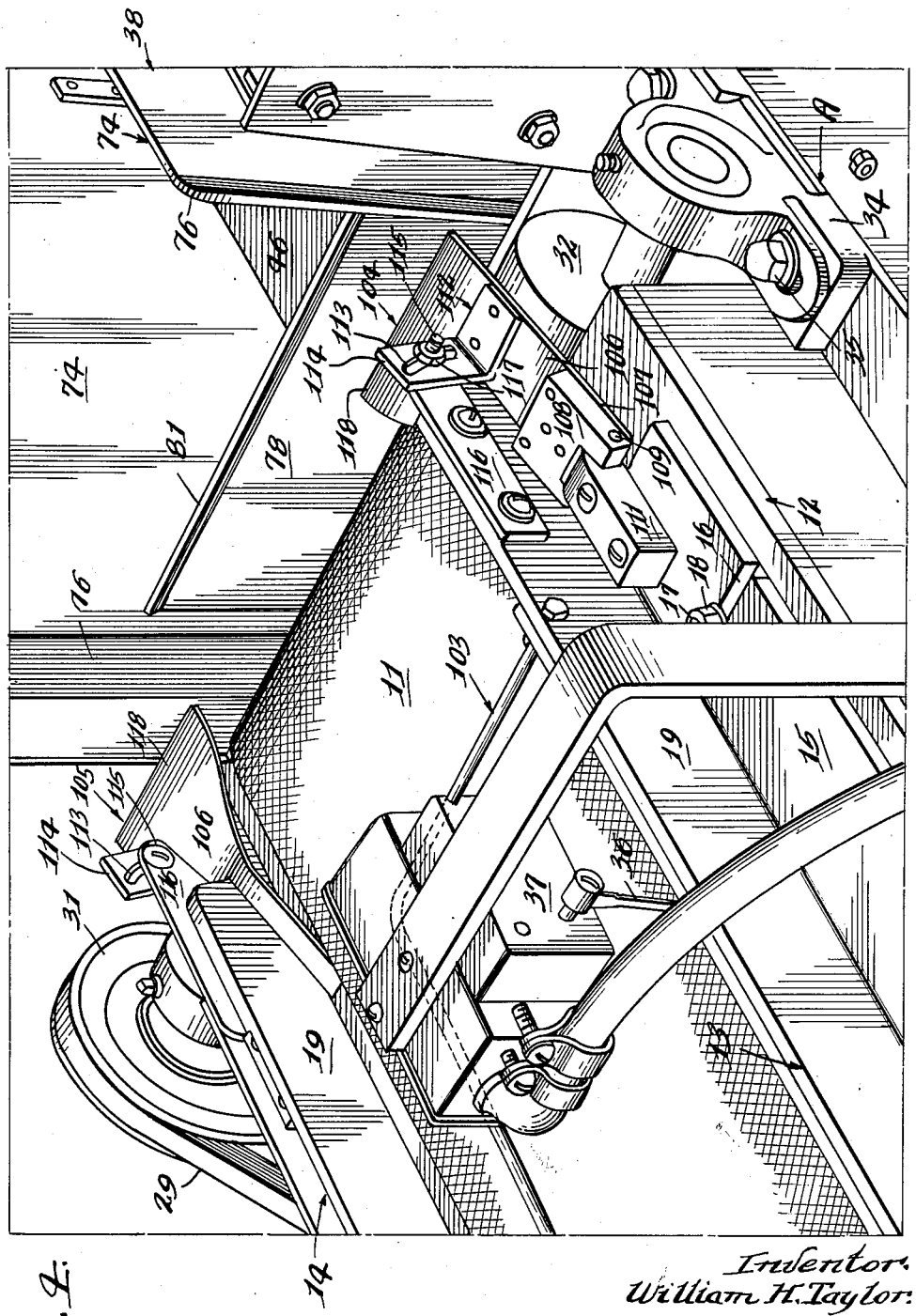

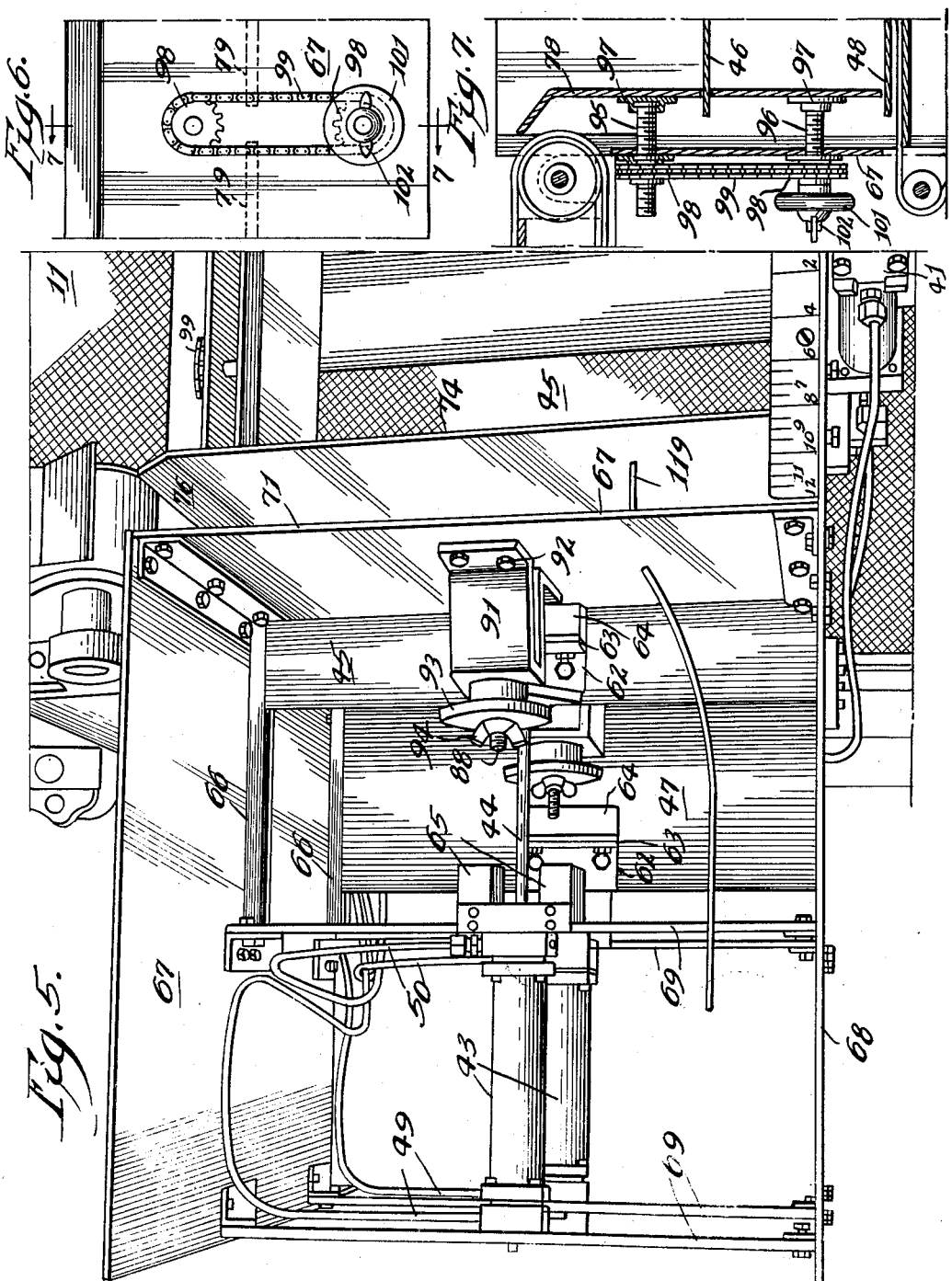

United States Patent Office 2,901,952
Patented Sept. 1, 1959

2,901,952

APPARATUS FOR FEEDING, COUNTING AND STACKING MAGAZINES, BOOKS AND OTHER ARTICLES

William H. Taylor, Chicago, Ill.

Application December 16, 1955, Serial No. 553,646

9 Claims. (Cl. 93—93)

The present invention relates to a novel apparatus for automatically feeding, counting and stacking magazines, books and other articles in aligned stacks of a predetermined number and delivering these stacks to a conveyor for removal or delivery.

One of the important objects of the present invention is the provision of a novel automatic means and mechanism for feeding individual magazines, books or other articles in sequence and in aligned relation, counting the articles delivered, discharging these counted articles in a novel manner into a hopper or box adapted to receive the articles in sequence and arrange them in stacked relation until a predetermined number have been collected, and depositing these stacks of the collected articles upon a movable conveyor.

Another and important object of the present invention is to provide a novel construction and arrangement of spaced guide members mounted at the opposite sides of the feeding conveyor for receiving, aligning and guiding the individual articles, such as magazines or books as they are fed in sequence to the hopper and collected and stacked therein, and novel means for readily adjusting and anchoring these guide members to the feed table. These side guide members extend longitudinally of and at the opposite sides of the rapidly moving conveyor and are adjusted to conform to the width of the magazines, books and the like being delivered thereto whereby the individual articles as they move along the feeding conveyor are all disposed in proper position and relation to be directed and guided into the collecting hopper.

A further object of the present invention is to provide at each end of the guide members at the opposite edges of the feed belt, a novel delivery guide for elevating and delivering each magazine or book into the hopper in flat condition. These end guides are spaced apart in such manner as to receive the open and the closed or stitched edges of the delivered magazines or books, and are upwardly inclined whereby to direct and discharge these articles from the feed belt at such inclination that the open edge thereof is prevented from dropping down and curling up in the hopper. Thus each magazine or book is delivered into the hopper flat or in a horizontal plane.

Another important object of the present invention is to provide the novel hopper with readily adjustable filler plates for controlling the effective internal dimensions of the hopper in substantial conformity to the size of the collected magazines, books or articles, and to align the collected articles in accurately stacked relation without the necessity of any jogging or auxiliary mechanism.

The present invention further comprehends a novel means or mechanism for effecting closing of the cover of successive magazines or books as they are fed by the rapidly moving feeding belt or conveyor to the hopper in which they are collected in stacks of a predetermined number.

A further object of the present invention is the provision of means for delivering air jets across the upper and lower receiving sections of the hopper to close and maintain closed the covers of any magazines or books collected therein, and thereby assuring that successive magazines or books collected and stacked therein remain flat and in superposed relation.

Another object of the present invention is the provision of novel means at the end or rear of the hopper for accurately determining and facilitating adjustment of the internal dimensions of the hopper to substantially conform to the size of the articles collected therein, and thereby accurately align the collected stack in the hopper.

The present invention is an improvement over that disclosed in my copending application Serial No. 373,725, filed August 12, 1953, now Patent No. 2,799,212.

Further objects are to provide a construction of maximum simplicity, efficiency, economy and ease of assembly and operation, and such further objects, advantages and capabilities as will later more fully appear and are inherently possessed thereby.

In the drawings:

Figure 1 is a view in side elevation of the novel apparatus for feeding, counting and stacking of magazines, books and other articles, including conveying means receiving and feeding the individual gathered articles to be counted and stacked in a collecting hopper and the conveying means for receiving each stack as it is discharged from the hopper and delivering these stacks to any succeeding continuous operation or manual loading.

Fig. 4 is a fragmentary enlarged perspective view of the rear or delivery end of the feeding conveyor and, in addition, disclosing the counting mechanism, the end guides or delivery devices over which the articles are delivered to the hopper, and the forward end of the hopper with its adjustable filler plates.

Fig. 5 is an enlarged fragmentary top plan view showing the manner of operating the slide members forming the spaced bottoms of the hopper, one of the adjustable side filler plates and associated mechanism.

Fig. 6 is a fragmentary view in front elevation of the mechanism for adjusting the movable front filler plate of the hopper.

Fig. 7 is a view in vertical cross section taken in a plane represented by the line 7—7 of Fig. 6 and viewed in the direction of the arrows.

Figure 1:
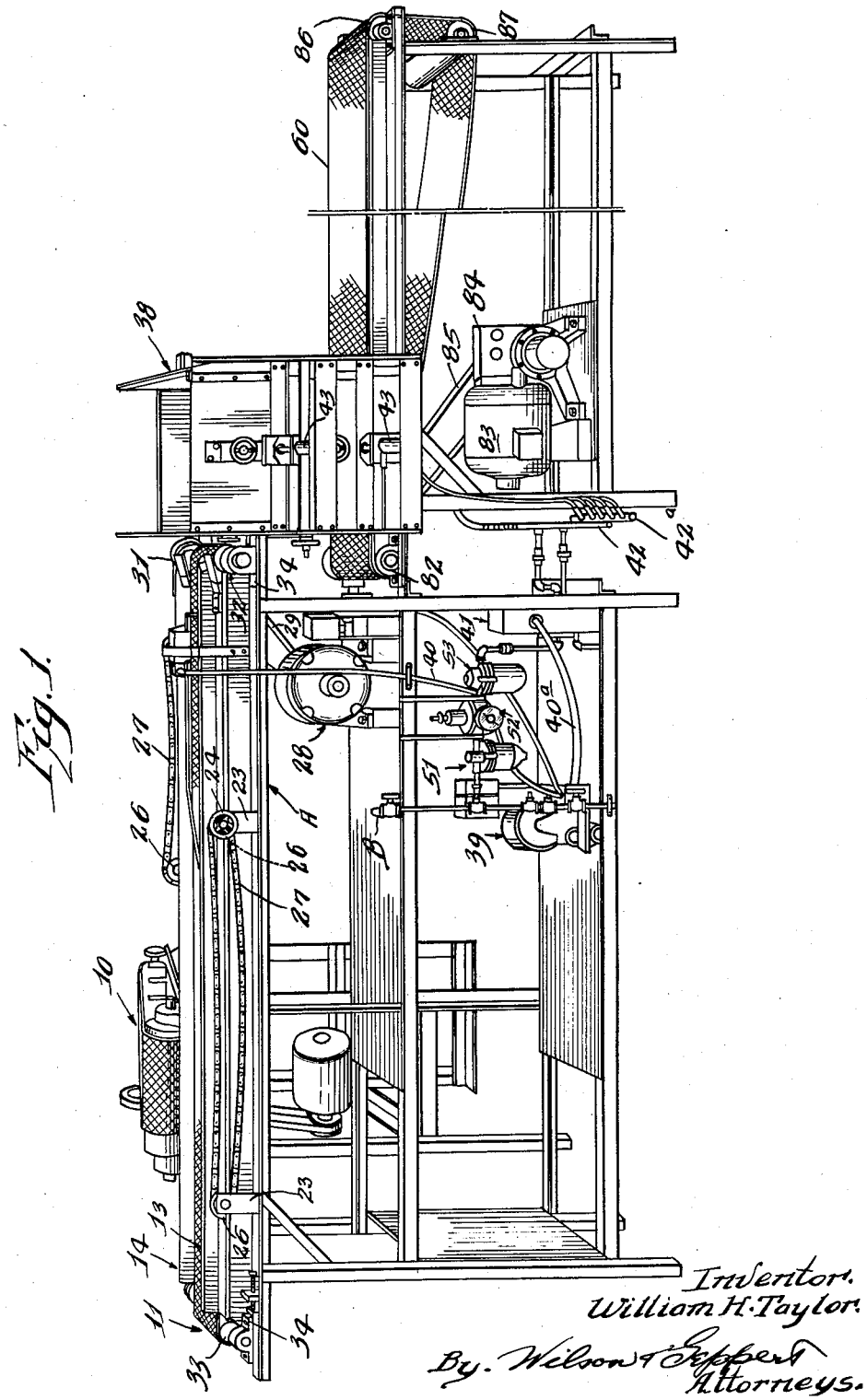

Referring more particularly to the disclosure in the drawings and to the novel illustrative embodiment therein selected to disclose the present invention, in the novel apparatus for feeding, counting and stacking articles capable of being collected and automatically stacked in a stack of a predetermined number, these articles are delivered to the novel apparatus and successively fed or conveyed in spaced but aligned relation, counted as they are being fed to and dropped into a hopper in which a predetermined number of the articles are collected upon vertically spaced, retractable slides forming spaced bottoms for the hopper, and when the predetermined number of such articles are collected the stack is discharged from the bottom slides and delivered to a conveyor or delivery belt for further handling. All of these successive operations are automatically performed.

Referring in detail to the disclosure in the drawings, the articles handled by the present assembly, such as magazines or books composed of a cover and intermediate pages gathered together and stitched or bound generally along one edge, are delivered from the gatherer or gathering machine onto a belt or conveyor 10 with its delivery end arranged at one side and above one end of an endless conveyor 11 operating at a relatively high speed over a substantially smooth upper surface of a table 12. The conveyor belt 11 upon which the individual articles are discharged from the belt 10, is preferably of less width than the width of the books or magazines delivered thereto, with the closed or stitched edge of each book or magazine being disposed adjacent a longitudinally extending guide member 13 and the open edge of the book or magazine disposed adjacent a similar guide member 14, with these guide members adapted to receive the books or magazines therebetween and spaced apart substantially the width of these articles.

Each guide member comprises a substantially L-shaped bar with its supporting flange or base 15 adjustably mounted upon the plate or table 12 and transversely slotted at 16 adjacent its ends to receive an upstanding anchoring bolt 17 secured in the table 12 and a nut 18 for anchoring and retaining each guide member in adjusted position. To facilitate such adjustment, each of the guide members 13 and 14 has affixed at 21 to its upstanding flange 19 one end of a laterally projecting screw 22 with this screw journalled in an upstanding bracket 23 affixed to the table 12. One of these screws is shown provided with a hand wheel 24 journalled in the bracket 23 and a winged lock nut 25 on its outer end whereby turning of the hand wheel causes the screw to move its guide member 13 or 14 laterally of the table and permits accurate adjustment of this guide member and retaining it in its adjusted position by the lock nut 25.

Figure 2:
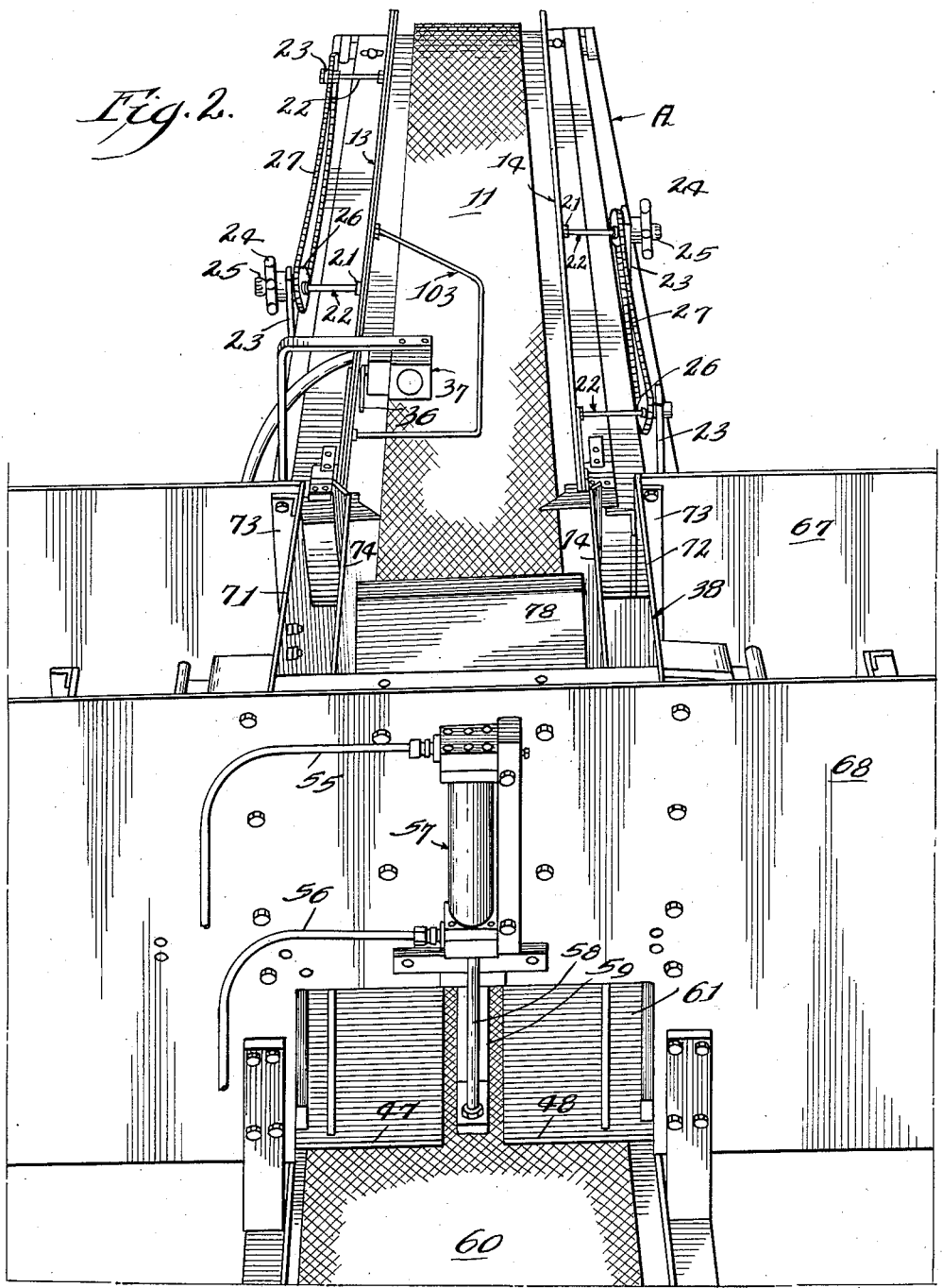
Fig. 2 is a perspective view of the novel feeding, counting and stacking assembly, the view looking down from the delivery end where the stacked articles are delivered or discharged from the collecting hopper.

As disclosed in Figs. 1 and 2, each guide member is preferably provded with two or more of these screws 22 suitably spaced apart, but one of which is provided with the hand wheel 24 and with each screw having a sprocket wheel 26 journalled in its bracket 23 with the hand wheel 24 connected to and rotating its sprocket wheel 26 and the latter rotating the sprocket wheel 26 on the other screw or screws 22 simultaneously through a chain 27. By this construction and arrangement, each of the guide members 13 and 14 is adjusted throughout its length and permits ready adjustment to accommodate magazines or books of different widths.

The guide member 13 at the closed or stitched end or edge of each magazine or book is disposed parallel to the length of the table 12 while the guide member 14 at the open end or edge of each magazine or book is disposed at an angle to the longitudinal axis of the table whereby these guide members are preferably spaced apart at the forward end a distance of approximately ½" greater than the width of the magazines or books where the latter are fed thereto by the conveyor belt 10 and spaced apart at the rear or delivery end just slightly greater than the width of the magazines or books. For example, the spacing at the forward end may be approximately 9/16" greater than the width of the magazines or books and at the delivery end adjacent the hopper approximately ⅛" greater than the width of the magazines or books.

The feed belt 11 operating at a relatively rapid speed of travel is driven by a motor or other drive unit 28 through a suitable drive means, such as a belt 29 and sheave 31 for rotating the shaft of a driven pulley 32 driving the belt 11 and a pulley 33 for the belt at the forward end of the table. The shaft for each of the pulleys 32 and 33 is rotatably mounted or journalled in a pillow block 34 adjustably mounted on the frame A supporting the table 12, with these pillow blocks being adjustably anchored to the frame by bolts or the like 35.

As the magazines or books advance with the belt 11 in aligned but spaced relation, each impacts or engages a depending arm 36 of an actuating switch 37 for counting the number of articles being delivered to and to be collected in a hopper 38 in which a predetermined number of the articles are stacked. This switch transmits an electrical impulse to an electrical counter 39 through the cable 40 and moves the counter one notch. When a full count, as determined by the setting of the counter, has been reached, a contact switch makes contact in the counter which energizes a four-way air valve in the housing 41.

The air valve connected to common supply lines 42 and 42ª automatically reverses the air pressure on the ends of multiple air cylinders 43 whereby the piston rod 44 of each cylinder is actuated in its proper direction and carries along therewith its reciprocating slide member. Two sets of horizontally arranged slide members are provided in the hopper with the upper slide members comprising two complementary sections 45 and 46 and the lower slide members comprising two complementary sections 47 and 48, with the upper and lower slide members being vertically spaced and movable into and out of the hopper. By supplying air to one end of each cylinder through a conduit or supply line 49 or a conduit or supply line 50, and exhausting it through the other, each piston rod 44 is moved in and out and carries therealong its respective slide member in predetermined sequence and synchronism.

The incoming air pressure which may be approximately 125 pounds per square inch, enters through inlet pipe B and through an air filter 51 into a pressure regulating valve 52 whereby the pressure is reduced to approximately 40 pounds per square inch. The passage of this air continues from the pressure regulating valve through an air line lubricator 53 which is preferably filled with oil and delivers oil into the air stream whereby to continuously lubricate the interior of each air cylinder for free movement of the piston therein. Air leaving the lubricator 53 enters the four-way valve 41 which is actuated by an electric switch in counter 39 connected to the valve by a cable 40ª, whereby to reverse the ports in the valve to deliver air in the required direction through either the pipe 49 or the pipe 50 connected to the opposite ends of each cylinder 43. This four-way valve also supplies air through pipes or conduits 55 and 56 to the ends of a cylinder 57 having a piston rod 58 carrying a depending and vertically movable slide 59 at the discharge end of the hopper 38 for retaining therein the books or magazines in stacked relation until the predetermined number have been collected and are ready to be discharged by opening the lower slide sections 47 and 48 of the hopper 38 and deposited on the conveyor 60.

The upper slide members 45 and 46 are moved into closed position whenever the lower slide members 47 and 48 are open to discharge an accumulated, stacked and counted number of the magazines or books, and the vertically operating retaining slide 59 is at such time elevated to open position to permit the discharge of the stack whenever the closed slide sections 47 and 48 are opened. When the lower slide members 47 and 48 are closed and the upper slide members 45 and 46 are opened, the retaining slide 59 is lowered to provide an abutment across the discharge or opening 61 at the rear of the hopper 38 (Fig. 2).

These upper slide members 45 and 46 and the lower slide members 47 and 48 are formed as horizontally arranged plates which when moved inwardly to an adjoining position provide a closure or supporting base for the magazines or books discharged into the hopper. Each slide member has affixed thereto an angle bracket 62 provided with an upstanding flange 63 connected to one end of its piston rod 44. A rubber bumper 64 is preferably provided on each angle bracket to absorb the shock of its piston rod 44 when the complementary slide members are moved inwardly to retaining or closed position, and one or more rubber blocks or bumpers 65 are provided to absorb the shock of each piston rod 44 when the slide members are moved to open position. Each slide member moves in spaced upper and lower guides 66 (Fig. 5).

The hopper is provided with side plates 67 and 68 and transverse supports or bars 69 upon which the vertically spaced, upper and lower air cylinders 43 are rigidly mounted, there being two such air cylinders at each side of the hopper, vertically arranged and spaced transverse walls 71 and 72 fixed to the side plates 67 and 68 by angle brackets 73, and adjustable and vertically spaced filler plates 74 and 75 which define the opposite sides of the hopper opening and provide upstanding walls for receiving therebetween the collected magazines or books. The upper filler plates 74 are outwardly flared at their forward ends at 76 and like the side walls 71 and 72 are spaced apart to provide a slot 77 to receive the upepr slide members 45 and 46, with the lower end of each plate 75 stopping short of the lower slide members 47 and 48.

The hopper is also provided with spaced vertically disposed end walls with the forward end wall 78 being adjustable and horizontally slotted at 79 intermediate its length to receive the upper slide members 45 and 46 and its lower end stopping short of the lower slide members 47 and 48. At its upper end 81 this end wall 78 is flared forwardly toward the adjacent discharge end of the feed belt 11 to effectively guide or direct the magazines or books discharged from this belt into the hopper. The rear wall or end plate 68 is cut away at its lower end to provide the opening 61 for the passage of each collected stack upon the belt 60 when these stacks are released upon opening of the lower slide members 47 and 48 and deposited upon the conveyor belt 60. This belt 60 is driven by a pulley 82 from a motor 83 and speed reducer 84 through a belt or chain drive 85. The belt 60 rotates at a relatively slow speed about pulleys 86 and 87 and delivers the stacks of articles deposited thereon for further handling.

Figure 3:
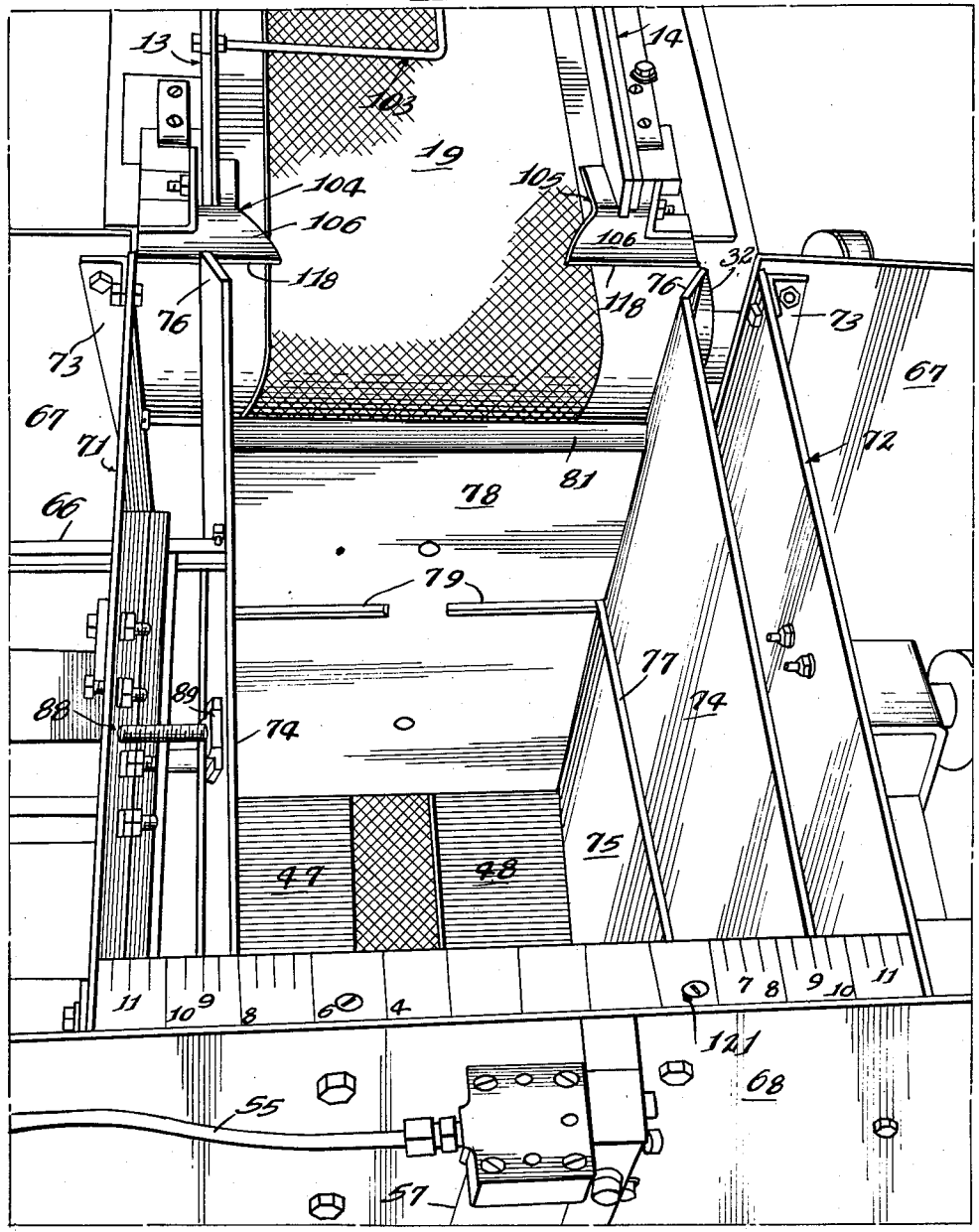
Fig. 3 is a fragmentary enlarged perspective view looking down upon the hopper and stacking mechanism from the delivery or discharge end.

Adjustment of the filler plates 74 and 75 is accomplished by means of an adjusting screw 88 having one affixed or connected to each filler plate at 89, with each screw projecting through an opening in its transverse wall 71 or 72 of the hopper 38 and through a substantially U-shaped bracket 91 rigidly secured at 92 to the wall 71 or 72. An internally threaded hand wheel 93 is rotatably mounted on the outwardly projecting end of each screw and provided with a winged nut or lock nut 94 for retaining the filler plates 74 and 75 in adjusted position (Figs. 1, 3 and 5).

The forward wall or filler plate 78 is also adjustably mounted in the hopper 38 by means of adjusting screws 95 and 96 (Figs. 6 and 7). Each adjusting screw is affixed in vertically spaced relation at 97 to the plate 78 with the forward end of each screw projecting through an opening in the side plate or end wall 67 at the exterior of which is mounted a sprocket wheel 98 having an internally threaded hub. These sprocket wheels are connected by a chain 99 whereby rotation of one of the sprocket wheels moves both in synchronism and moves the forward wall or filler plate 78 relative to the side wall or plate 67 to vary the effective length of the hopper 38. To rotate the sprocket wheels 98 in either direction, one is affixed to a hand wheel 101 with a wing nut or lock nut 102 locking the hand wheel and its sprocket wheel in adjusted position.

The present invention comprehends novel means and mechanism for assuring that each magazine or book that is collected in the hopper 38 is delivered thereto (1) with its cover or top leaf closed, (2) that each when delivered to the hopper is deposited therein in such manner that the open side of the magazine or book is prevented from dropping first and curling up in the hopper but deposited flat, and (3) that the magazines or books collected in the hopper are retained therein with the cover or top leaf closed.

To assure closing of each magazine or book as it is being delivered by the feed belt 11 (Figs. 2, 3 and 4), there is provided a member 103 in the form of a wire or rod having its ends anchored to the upstanding flange 19 of the guide member 13, and projecting a substantial distance over the belt 11 at an elevation that permits the closed magazines or books to pass thereunder without contact but, where the cover or top leaf of a magazine or book is open or elevated, such cover or top leaf abuts the closing member 103 and is depressed and closed thereby.

To prevent the open side of a magazine or book being delivered to the hopper from dropping first and curling up in the hopper, each magazine or book as it leaves the feed belt 11 is directed over a pair of delivery devices 104 and 105 (Figs. 3 and 4) which receive the opposite edges (i.e. the open and closed or stitched ends or edges of the magazines or books), and elevate these edges for directing the articles into the hopper 38. Each delivery device 104 or 105 comprises a guide plate 106 having its lower end 107 projecting beneath the ends of the guide members 13 and 14 which are cut away to receive these ends. Each end 107 has secured thereto a notched block 108 with its bifurcated ends pivotally or hingedly connected by a pin 109 to a block 111 secured to and carried upon the base flange 15 of the guide members 13 and 14.

To retain each guide plate 106 in its desired, upwardly inclined position, there is provided a bracket 112 having its base anchored to the plate and provided with an arcuate slot 113 in its upstanding flange 114, and through which slot projects the threaded shank of a bolt 115 mounted in the projecting end of a plate 116 secured to and carried by the upstanding flange 19 of the guide members 13 and 14. A lock nut 117 retains the delivery devices 104 and 105 in their adjusted position.

In their adjusted position, the delivery device 105 at the open side or edge of the magazines or books is elevated at its discharge end 118 to a somewhat greater height than the elevated discharge end 118 of the delivery device 104 receiving the closed or stitched side or edge of these magazines or books, to thereby prevent the open side from dropping first and curling up in the hopper. Excellent results have been obtained by elevating the end 118 of the guide plate 106 of the delivery device 105 approximately 1" above the belt and the end 118 of the guide plate 106 of the delivery device 104 approximately ¾" above the belt 11. However, such adjustment may be varied according to the width of the books, the delivery devices 104 and 105 being carried upon and moved laterally with the guide members 13 and 14.

When the magazines or books are delivered flat into the hopper from the delivery devices 104 and 105, provision is also made for retaining the covers in lowered position so as to prevent damage thereto when the next or succeeding magazine or book enters the hopper 38. This is accomplished by connecting a length of flexible hose 119 through the side plates 67 and 68 to each of the filler plates 74 and 75 and directing an air jet onto the magazines or books collected in the hopper 38.

To facilitate and to assure accurate adjustment of the filler plates 74 and 75 to the width of the articles collected, a ruler 121 is provided. By the construction and arrangement for readily adjusting the filler plates 74, 75 and 78, the internal dimensions of the hopper 38 may be adjusted to substantially conform to the dimensions of the articles being collected and stacked.

The conveyor belt 11 for feeding the articles to the hopper 38 operates at a relatively greater speed than the belt 60 upon which the stacked articles are delivered. Their speed may be readily adjusted relative to each other and relative to the speed of delivery of the articles from the belt 10. This may be accomplished by substituting different diameter sheaves for driving these conveyor belts at the desired speed of travel.

Books or magazines discharged onto the conveyor belt 11 and moved thereby for discharge into the hopper or box 38, drop onto the lower slide members 47 and 48 until a predetermined number for which the counter 39 has been set have collected on these slide members. Then these slide members are retracted and the vertically movable retaining slide 59 is elevated whereby the discharged stack drops onto the conveyor belt 60 and is moved laterally on this belt through the opening 61 in the end wall or plate 63 of the box or hopper 38.

When the lower slide members 47 and 48 are retracted to open position and the retaining slide 59 is raised, the upper slide members 45 and 46 are moved to closed or retaining position to receive any books or magazines delivered while the lower slide members are open. As soon as the stack is moved by the conveyor belt 60 beyond the opening 61, these slide members 45 and 46 open. Simultaneously, the retaining slide 59 is lowered. At such time, any magazines or books collected on the upper slide members 45 and 46 drop onto the lower slide members 47 and 48 and remain thereupon until the counted number have been stacked, when these lower slide members open to discharge the stack and the sequence of operation above described continues.

Having thus disclosed the invention, I claim:

1. In a feeding, counting and stacking mechanism for articles including magazines and books, a hopper for conformably receiving and stacking therein individual articles, a conveyor belt for feeding individual articles to the hopper, a guide member at each side of the conveyor and spaced apart to conformably receive therebetween the articles and to align and maintain said articles in alignment as they are fed to the hopper, and means at the end of each guide member for elevating the opposite edges of the articles conveyed along the guide members and depositing each article flat in the hopper.

2. In a feeding, counting and stacking mechanism for books, magazines and the like, a hopper for collecting a predetermined number of said books into a stack and discharging said stack when completed, a conveyor for feeding individual books to said hopper, and means adjacent the discharge end of said conveyor for receiving the open and closed sides of successive books conveyed thereto and elevating and directing each book flat into the hopper and preventing the open side of the book from dropping first into the hopper and curling up.

3. In a feeding, counting and stacking mechanism for articles including magazines and books, a hopper for conformably receiving and stacking therein individual articles in superposed relation, a conveyor belt for feeding individual articles to the hopper, means for positioning and aligning the articles on the conveyor belt, and means for receiving and elevating the opposite sides of said articles from above the discharge end of the belt and directing and discharging the articles into the hopper in such manner that successive articles drop flat into the bottom of the hopper.

4. In a feeding and stacking mechanism for articles including magazines and books, a hopper for conformably receiving and stacking therein individual articles, a conveyor belt for feeding individual articles to the hopper, a guide member extending along each edge of the belt for aligning and guiding the opposite open and closed sides of each article as it is carried toward the discharge end of the belt, and an upwardly and rearwardly inclined delivery member at the end of each guide member receiving the open and closed sides of said articles and elevating and directing the articles in sequence into the hopper in such manner that successive articles drop flat into the bottom of the hopper and collect in a stack.

5. In a feeding and stacking mechanism for articles such as books and magazines as set forth in claim 4, including means for adjustably mounting said delivery members to vary their angle of inclination.

6. In a feeding and stacking mechanism for articles such as books and magazines as set forth in claim 4, in which the guide member for receiving and elevating the open side of the article is disposed at a greater inclination than the guide member for the closed side of the article.

7. In a feeding, counting and stacking mechanism having conveying means for receiving and feeding successive articles such as magazines and books deposited on and discharging the articles from one end of said conveying means, a hopper aligned with the discharge end of said conveying means for collecting the articles delivered by the latter into a stack of a predetermined number, said hopper providing an enclosure for collecting, stacking and confining said articles including vertically disposed and laterally spaced side walls and longitudinally spaced end walls, one of said end walls being disposed adjacent the delivery end of said conveying means, vertically disposed filler plates disposed inwardly of each side plate, means for adjusting said end wall adjacent the delivery end of said conveying means and said filler plates to thereby vary the internal dimensions of the hopper to conform to the size of the collected and stacked articles therein, two pairs of vertically spaced and horizontally arranged slide members providing bottom closures for the hopper to collect thereon the counted and stacked articles, said end wall adjacent the delivery end of said conveying means being horizontally slotted and said filler plates spaced apart to provide horizontal slots for receiving the reciprocating slide members, and means for alternately moving said pairs of slide members with one pair moved to closed position when the other pair is moved to open position.

8. In a feeding, counting and stacking mechanism for articles having conveying means for receiving and feeding successive articles such as magazines and books deposited on and discharging the articles from one end of said conveying means, a hopper aligned with the discharge end of said conveying means and providing an enclosure for collecting and confining therein articles delivered by the conveying means into a stack of a predetermined number, said hopper having vertically disposed and laterally spaced side walls, an end wall and shiftable end and side members mounted within said hopper and between said side walls for varying the internal dimensions of said hopper to conform to the size of the collected articles, means for adjusting said end and side members, vertically spaced and horizontally arranged pairs of reciprocating slide members movable inwardly to form vertically spaced bottom closures and supporting bases to collect articles discharged into said hopper and movable outwardly to discharge said collected articles, and means for alternately moving said pairs of slide members with one pair moved to open position when the other pair is moved to closed position, said end member being slotted and said side plates spaced apart for receiving the upper pair of said slide members during reciprocation.

9. In an article feeding, counting and stacking mechanism having conveying means for receiving, feeding and discharging the counted articles, a hopper for receiving, collecting and stacking the individual articles discharged from said conveying means and having fixed side walls and an end wall, an end and side filler plates between said side walls combining to provide a relatively deep enclosure for receiving and confining a stack of said articles, means for adjusting said filler plates to conform to the dimensions of and stack the individual articles in superposed and jogged relation, and two pairs of horizontally arranged and vertically spaced slide members movable alternately and longitudinally into closed and open positions with one pair movable into closed position when the other pair is moved to open position to intercept any articles then supplied to the hopper and provide vertically spaced bottoms for said hopper, and means for alternately moving said pairs of slide members to closed and open positions, said end plate being slotted and said side plates spaced apart to provide horizontally arranged slots for receiving the upper pair of said slide members during reciprocating movement.

References Cited in the file of this patent

UNITED STATES PATENTS

| | | |
|---|---|---|
| 862,161 | Hollett | Aug. 6, 1907 |
| 1,563,071 | Brecknell | Nov. 24, 1925 |
| 1,600,958 | Hart et al. | Sept. 21, 1926 |
| 1,808,142 | Labombarde | June 2, 1931 |
| 1,902,436 | Joachim | Mar. 21, 1933 |
| 2,273,472 | Kottmann | Feb. 17, 1942 |
| 2,540,972 | Wagner et al. | Feb. 6, 1951 |
| 2,701,650 | Stevenson | Feb. 8, 1955 |
| 2,729,136 | Reick et al. | Jan. 3, 1956 |